(12) United States Patent
Fang et al.

(10) Patent No.: US 11,796,670 B2
(45) Date of Patent: Oct. 24, 2023

(54) RADAR POINT CLOUD DATA PROCESSING METHOD AND DEVICE, APPARATUS, AND STORAGE MEDIUM

(71) Applicants: Beijing Baidu Netcom Science and Technology Co., Ltd., Beijing (CN); Baidu USA LLC, Sunnyvale, CA (US)

(72) Inventors: Jin Fang, Beijing (CN); Dingfu Zhou, Beijing (CN); Xibin Song, Beijing (CN); Liangjun Zhang, Sunnyvale, CA (US)

(73) Assignees: Beijing Baidu Netcom Science and Technology Co., Ltd.; Baidu USA LLC, Sunnyvale, CA (US)

( * ) Notice: Subject to any disclaimer, the term of this patent is extended or adjusted under 35 U.S.C. 154(b) by 296 days.

(21) Appl. No.: 17/325,762

(22) Filed: May 20, 2021

(65) Prior Publication Data
US 2021/0270958 A1 Sep. 2, 2021

(51) Int. Cl.
*G01S 13/89* (2006.01)
*G01S 13/42* (2006.01)

(52) U.S. Cl.
CPC .............. *G01S 13/89* (2013.01); *G01S 13/42* (2013.01)

(58) Field of Classification Search
CPC ................................. G01S 13/89; G01S 13/42
See application file for complete search history.

(56) References Cited

U.S. PATENT DOCUMENTS

| 2018/0188060 | A1* | 7/2018 | Wheeler | ............. G01C 21/3635 |
| 2019/0371044 | A1* | 12/2019 | Yu | ............................ G06T 17/00 |
| 2021/0019453 | A1 | 1/2021 | Yang et al. | |

FOREIGN PATENT DOCUMENTS

| CN | 112330815 A | 2/2021 |
| CN | 112365600 A | 2/2021 |
| CN | 112639822 A | 4/2021 |
| CN | 112651881 A | 4/2021 |
| EP | 3579188 A2 | 12/2019 |
| EP | 3579188 A3 | 3/2020 |
| JP | 2020034559 A | 3/2020 |
| JP | 2020035441 A | 3/2020 |

\* cited by examiner

*Primary Examiner* — Peter M Bythrow
*Assistant Examiner* — Nazra Nur Waheed
(74) *Attorney, Agent, or Firm* — Husch Blackwell LLP

(57) ABSTRACT

A radar point cloud data processing method and device, an apparatus, and storage medium are provided, which are related to technical fields of radar point cloud, automatic driving, and deep learning. An implementation includes: determining a target location area where a target object is located by utilizing a target detection box in the radar point cloud data; removing each point of the target object in the target location area from the radar point cloud data; and adding an object model to the target location area. By applying embodiments of the present disclosure, richer radar point cloud data may be obtained by removing the target object from the radar point cloud data and adding the needed three-dimensional model to the target location area in the radar point cloud data.

17 Claims, 10 Drawing Sheets

RADAR POINT CLOUD DATA PROCESSING METHOD AND DEVICE, APPARATUS, AND STORAGE MEDIUM

TECHNICAL FIELD

The present disclosure relates to a technical field of data processing, and in particular, to technical fields of radar point cloud, automatic driving, and deep learning.

BACKGROUND

With the rise of technologies such as automatic driving, radar apparatuses play an increasingly important role in these technologies for safety reasons. Radar has almost become a standard configuration of most autopilot companies due to its insensitivity to lighting conditions and good range sensing capability. Due to the rise of deep learning technologies and three-dimensional technologies, target detection based on radar point cloud data occupies a dominant position in sensing systems in the automatic driving industry.

SUMMARY

The present disclosure provides a radar point cloud data processing method and device, an apparatus, and a storage medium.

According to one aspect of the present disclosure, a method for processing radar point cloud data is provided, including:

determining a target location area where a target object is located by utilizing a target detection box in the radar point cloud data;

removing each point of the target object in the target location area from the radar point cloud data; and adding an object model to the target location area, to obtain updated radar point cloud data.

According to another aspect of the present disclosure, a radar point cloud data processing device is provided, including:

a determination module, configured to determine a target location area where a target object is located by utilizing a target detection box in the radar point cloud data;

a removing module, configured to remove each point of the target object in the target location area from the radar point cloud data; and an adding module, configured to add an object model to the target location area, to obtain updated radar point cloud data.

According to another aspect of the present disclosure, there is provided an electronic apparatus including:

at least one processor; and a memory communicatively connected to the at least one processor, wherein the memory stores instructions executable by the at least one processor, the instructions are executed by the at least one processor to enable the at least one processor to perform the method in any one of the embodiments of the present disclosure.

According to another aspect of the present disclosure, there is provided a non-transitory computer readable storage medium for storing computer instructions. The computer instructions, when executed by a computer, cause the computer to perform the method in any one of the embodiments of the present disclosure.

According to another aspect of the present disclosure, there is provided a computer program product including computer executable instructions stored thereon, wherein the executable instructions, when executed by a processor, cause the processor to implement the method in any one of the embodiments of the present disclosure.

It is to be understood that the description in this section is not intended to identify key or important features of the embodiments of the present disclosure, nor is it intended to limit the scope of the present disclosure. Other features of the present disclosure will become readily apparent from the following description.

BRIEF DESCRIPTION OF THE DRAWINGS

The accompanying drawings are used to better understand the present scheme and do not constitute a limitation to the present disclosure. In the drawings.

DETAILED DESCRIPTION

Exemplary embodiments of the present disclosure are described below in combination with the accompanying drawings, including various details of the embodiments of the present disclosure to facilitate understanding, which should be considered exemplary only. Therefore, those of ordinary skill in the art should realize that various changes and modifications can be made to the embodiments described herein without departing from the scope and spirit of the present disclosure. Also, descriptions of well-known functions and structures are omitted from the following description for clarity and conciseness.

Figure 1:
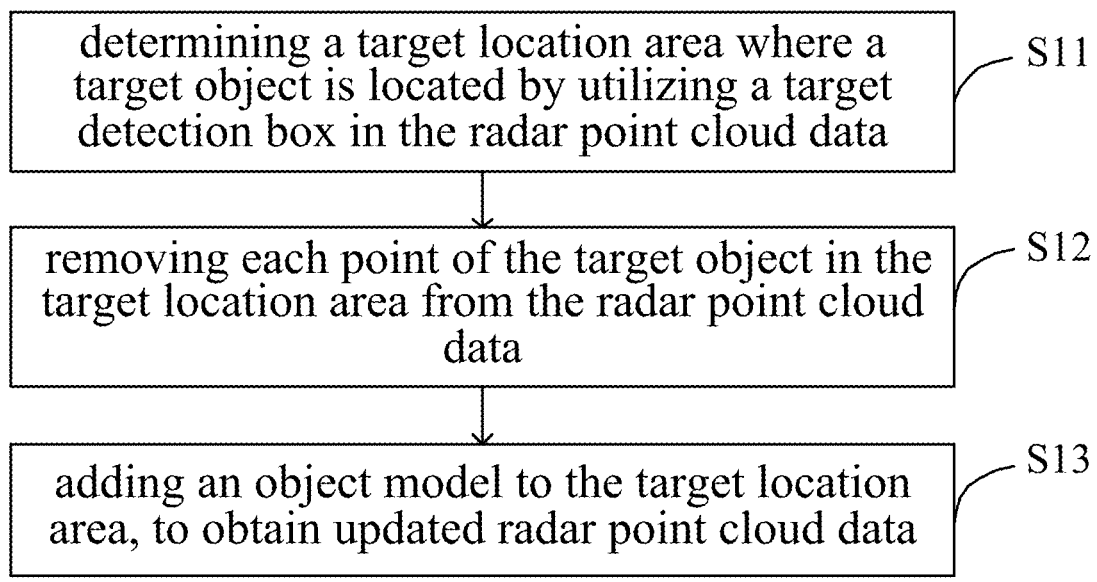
FIG. 1 is a flow diagram of a radar point cloud data processing method according to an embodiment of the present disclosure.

FIG. 1 is a flow diagram of a radar point cloud data processing method according to an embodiment of the present disclosure. The method may include:

S11: determining a target location area where a target object is located by utilizing a target detection box in the radar point cloud data;

S12: removing each point of the target object in the target location area from the radar point cloud data; and S13: adding an object model to the target location area, to obtain updated radar point cloud data.

By way of example, radar (LiDAR) point cloud data may also be referred to as radar point cloud, lidar point cloud, lidar point cloud data, etc. Each point in radar point cloud data may include three-dimensional coordinate information, such as coordinate information representing each point in the radar point cloud data by coordinates along three axes, X, Y, and Z. Each point in the radar point cloud data sometimes also contains color information, reflection intensity information, echo number information, etc.

One or more objects may be included in raw radar point cloud data. Objects that need to be removed from raw radar point cloud data may be referred to as target objects. The number of target objects that can be removed from raw radar point cloud data each time can be one or more, which is not limited in the present disclosure.

Raw radar point cloud data may include a target detection box with a labeled three-dimensional object. The target detection box may be determined by manual labeling or automatic labeling. By means of the target detection box, the range of a target object, i.e., the target location area in which the target object is located, can be determined. Each point within the target location area may be removed. For example, each point of the target object within the target location area is removed from the radar point cloud data, i.e., the target object is removed from the radar point cloud data, by means such as setting the maxima of those points. Radar point cloud data not including the target object can be obtained after the removal. A pre-generated three-dimensional model may be added to the radar point cloud data that do not include the target object.

By applying the embodiment of the present disclosure, richer radar point cloud data may be obtained by removing the target object from the radar point cloud data and adding a needed three-dimensional model to the target location area in the radar point cloud data. Furthermore, meeting the need of richer radar point cloud data of application scenarios is facilitated.

Figure 2:
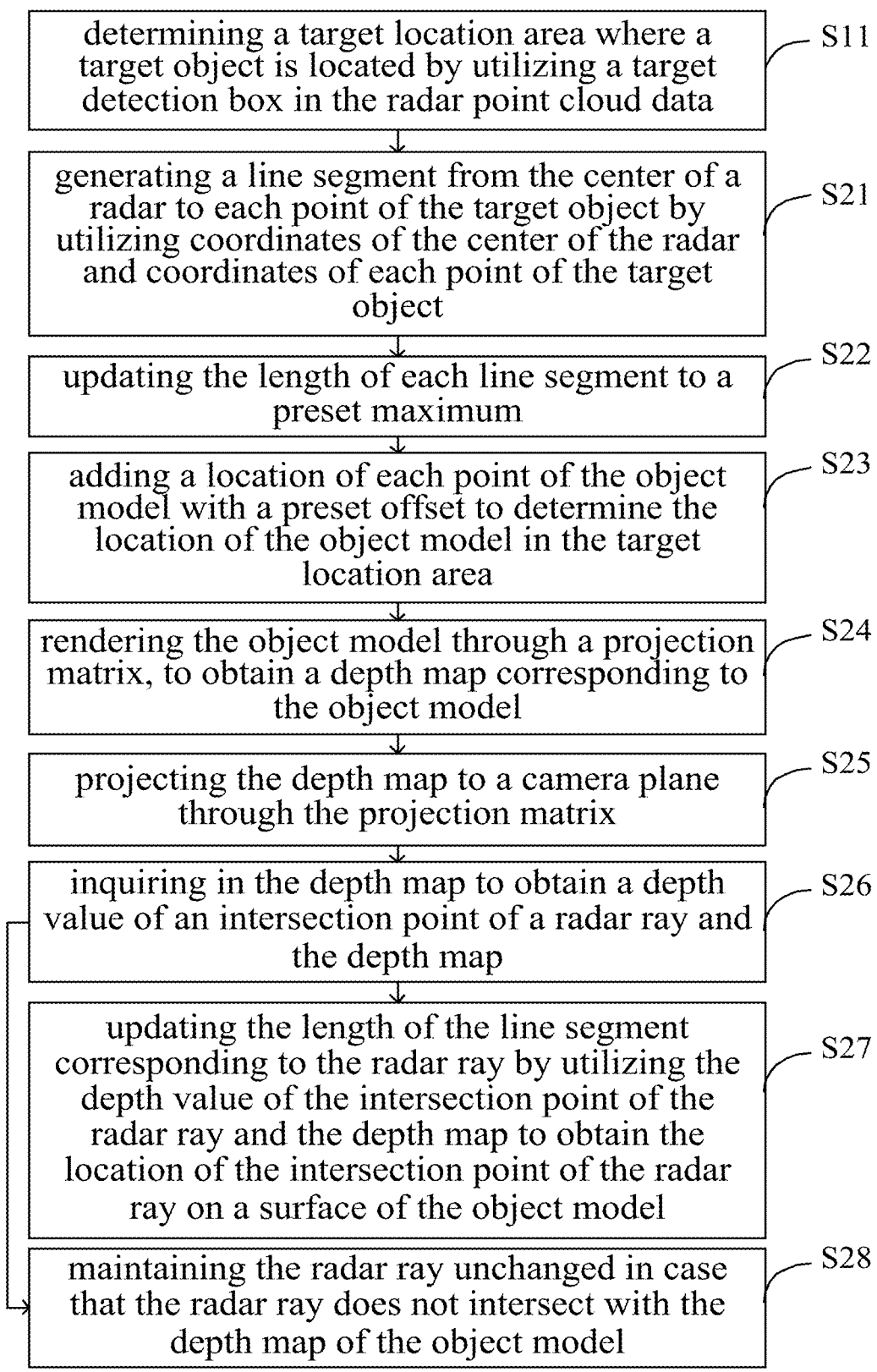
FIG. 2 is a flowchart of a radar point cloud data processing method according to another embodiment of the present disclosure.

FIG. 2 is a flowchart of a radar point cloud data processing method according to another embodiment of the present disclosure. The radar point cloud data processing method of this embodiment may include the steps of the embodiment described above. In one implementation, the target detection box is a three-dimensional box; the target object is a three-dimensional object and the object model is a three-dimensional model. In reference to the example in the above embodiment, the target detection box in the radar point cloud data may be represented by three-dimensional coordinate information, depth, direction, etc. The location of each point of the target object to be removed may also be represented by three-dimensional coordinate information. The object model to be added may also be a three-dimensional model pre-made using a three-dimensional model generation software. By adopting three-dimensional target detection box, target object and object model, obtaining more real and accurate radar point cloud data is facilitated.

In one implementation, S12 includes: S21: generating a line segment from the center of a radar to each point of the target object by using coordinates of the center of the radar and coordinates of each point of the target object; and S22: updating the length of each line segment to a preset maximum.

By way of example, lines may be formed by connecting the coordinates of the center of the radar to each point of the target object, and the direction of these lines may be oriented from the center of the radar to the points of the target object. Since there is a certain distance between the center of the radar and each point, this distance can be taken as the length of the connecting line between the center of the radar and each point. In general, the shorter the distance, the shorter the length of the connecting line; the longer the distance, the longer the length of the connecting line. If the length of these connecting lines is set to a certain maximum, the distance from the center of the radar to each point of the target object is the maximum, which is equivalent to regarding the location of the target object as having no object and enables the target object to be conveniently removed from the radar point cloud data. The maximum can be flexibly set according to different application scenarios, and the specific value range of the maximum is not limited by the present disclosure.

In one implementation, S13 includes: S23: adding the location of each point of the object model with a preset offset to determine the location of the object model in the target location area. For example, the coordinates of each point of the three-dimensional object model are added with a preset offset, thereby simply and conveniently realizing placing the three-dimensional object model into the radar point cloud data that do not include the target object. The offset can be flexibly set according to different application scenarios, and the specific value range of the offset is not limited by the present disclosure.

In one implementation, S13 further includes: S24: rendering the object model through a projection matrix, to obtain a depth map corresponding to the object model; S25: projecting the depth map to a camera plane through the projection matrix; S26: inquiring in the depth map, to obtain the depth value of an intersection point of a radar ray and the depth map; and S27: updating the length of the line segment corresponding to the radar ray by using the depth value of the intersection point of the radar ray and the depth map to obtain a location of the intersection point of the radar ray on a surface of the object model.

A projection matrix is a basic matrix of a three-dimensional figure. A three-dimensional object model can be rendered by multiplying a projection matrix with each vertex of the three-dimensional object model, to obtain a depth map corresponding to the three-dimensional object model. For example, a three-dimensional object model can be composed of a plurality of patches, each three vertices can be connected forming a triangular patch, and all vertices of the three-dimensional object model can be multiplied by a projection matrix, to obtain a depth map corresponding to the three-dimensional object model. The depth map is multiplied by the projection matrix and the depth map can be projected onto a camera plane. By traversing all radar rays, radar rays emitted from the center of a radar and passing through all points of the target area location may be obtained. By inquiring in the depth map, whether each radar ray intersects with the depth map of the object model may be determined. If there is an intersection, the depth value of the intersection point of the radar ray with the depth map can be obtained. The lengths of the line segments corresponding to the radar rays having an intersection point with the depth map are updated with the depth values of those intersection points. For example, originally the lengths of the radar rays are the maximum, which can be correspondingly updated to a distance from the center of the radar to each intersection point. Thus, the object model is rendered through the projection matrix, to obtain a depth map of the object model in which the intersection point with a radar ray is searched, which may speed up depth value inquiry and the location of the intersection point of the radar ray on the surface of the three-dimensional object model may be obtained more quickly.

In one implementation, S13 further includes: S28: maintaining the radar ray unchanged in case that the radar ray does not intersect with the depth map of the object model. If the radar ray does not intersect with the depth map, the length of the radar ray may be kept unchanged. In this case, some points in the target location area can be distinguished from the newly added object model, and a model completely different from the target object can be added.

Figure 3:
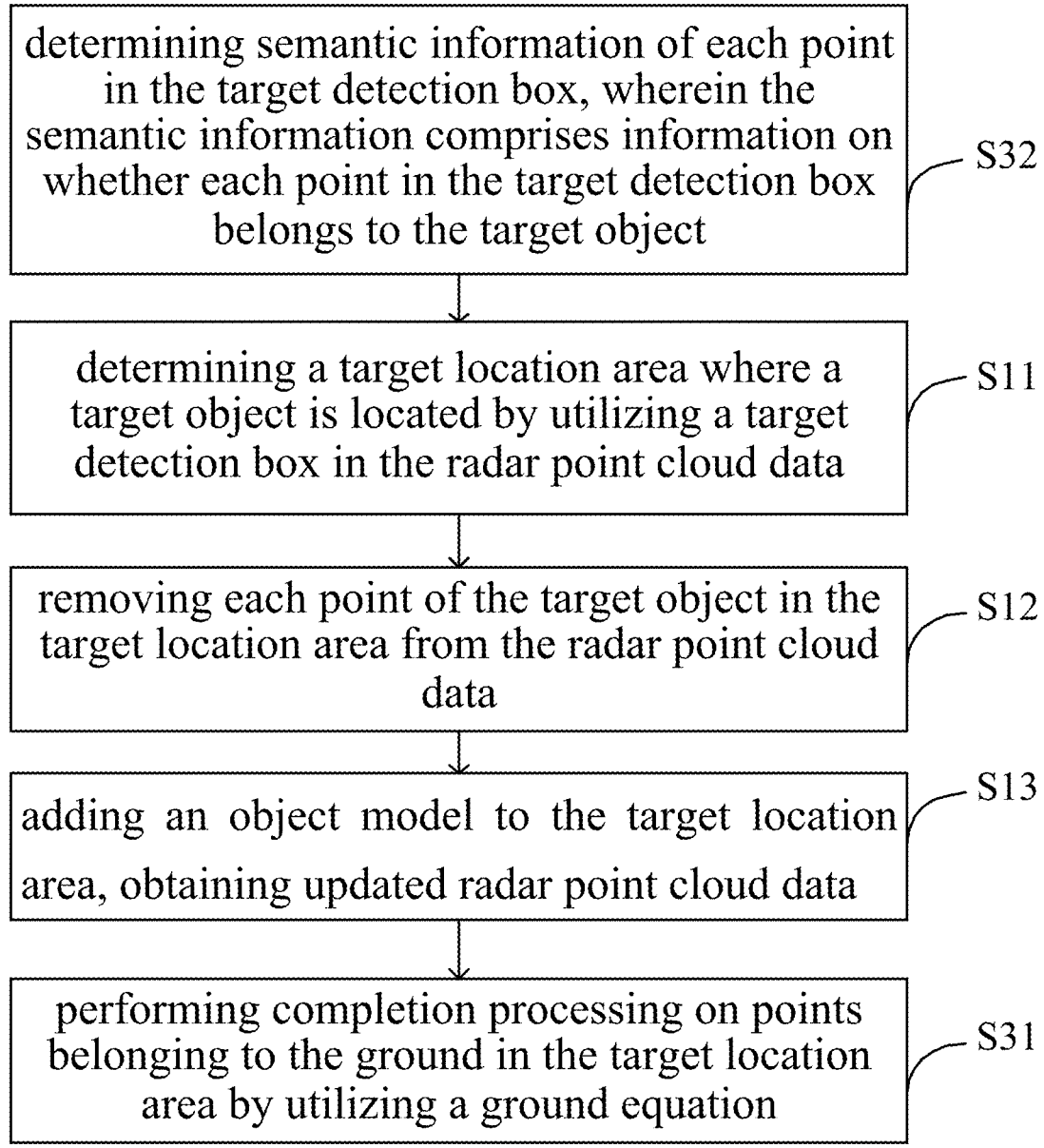
FIG. 3 is a flowchart of a radar point cloud data processing method according to another embodiment of the present disclosure.

FIG. 3 is a flowchart of a radar point cloud data processing method according to another embodiment of the present disclosure. The radar point cloud data processing method of this embodiment may include the steps of the embodiments described above.

In one implementation, the method further includes: S31: completing the points belonging to the ground in the target location area by utilizing a ground equation.

After the three-dimensional object model is added, in the radar point cloud data, some points that do not belong to the three-dimensional object model may exist in the target location area where the original target object is located. These points can be regarded as points belonging to the ground, and these points are completed using a ground equation. Thus, radar point cloud data more similar to an actual scene can be obtained.

In addition, if the radar point cloud data further include points belonging to other objects such as wall surfaces that need to be completed, completion processing may be performed by using a relevant completion algorithm.

In one implementation, the method further includes: S32: determining semantic information of each point in the target detection box, wherein the semantic information includes information on whether each point in the target detection box belongs to a target object.

By way of example, semantic information of each point within a target detection box may indicate that those points belong to a target object; semantic information of each point outside the target detection box may indicate that those points do not belong to the target object. Specifically, for example, if a target object is a vehicle, the semantic information of each point within the range of the target object determined by a target detection box may indicate that the point belongs to the vehicle. The semantic information of a point outside the range of the target object may indicate that the point does not belong to the vehicle. After determining the semantic information of each point within the target detection box, S11, S12 and S13 are performed. For example, in S12, points belonging to a target object can be accurately determined using semantic information of those points, thereby generating a plurality of line segments using the center of a radar and those points.

Figure 4:
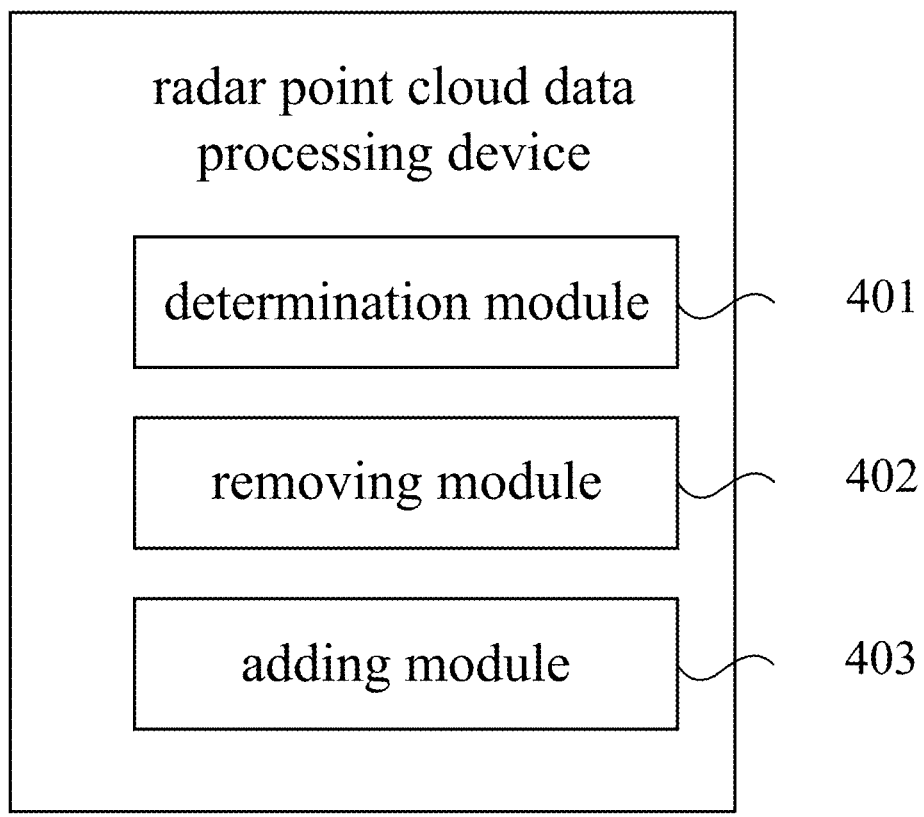
FIG. 4 is a block diagram of a radar point cloud data processing device according to an embodiment of the present disclosure.

FIG. 4 is a block diagram of a radar point cloud data processing device according to an embodiment of the present disclosure. The device may include:

a determination module 401, configured to determine a target location area where a target object is located by utilizing a target detection box in the radar point cloud data;

a removing module 402, configured to remove each point of the target object in the target location area from the radar point cloud data; and an adding module 403, configured to add an object model to the target location area, to obtain updated radar point cloud data.

Figure 5:
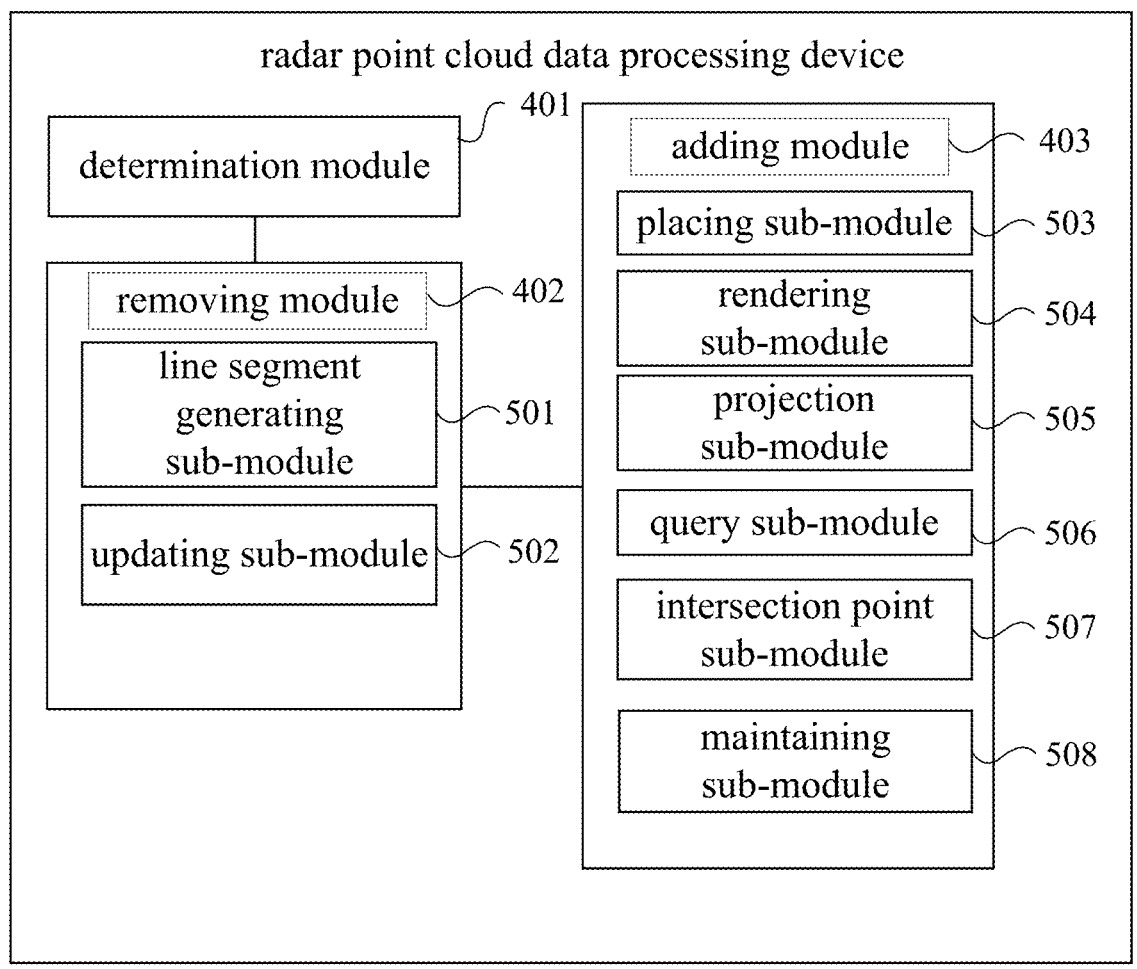
FIG. 5 is a block diagram of a radar point cloud data processing device for according to another embodiment of the present disclosure.

FIG. 5 is a block diagram of a radar point cloud data processing device according to another embodiment of the present disclosure. The radar point cloud data processing device of this embodiment may include various components of the device embodiments described above. In this embodiment, in one implementation, a target detection box is a three-dimensional box; the target object is a three-dimensional object, and the object model is a three-dimensional model.

In one implementation, the removal module 402 includes: a line segment generating sub-module 501, configured to generate a line segment from the center of a radar to each point of the target object by using the coordinates of the center of the radar and the coordinates of each point of the target object; an updating sub-module 502, configured to update the length of each line segment to a preset maximum.

In one implementation, the adding module 403 includes: a placing sub-module 503, configured to add the location of each point of the object model with a preset offset to place the object model at a location within the target location area.

In one implementation, the adding module 403 further includes: a rendering sub-module 504, configured to render the object model through a projection matrix, to obtain a depth map corresponding to the object model; a projection sub-module 505, configured to project the depth map to a camera plane through the projection matrix; a query sub-module 506, configured to inquire in the depth map, to obtain the depth value of the intersection point of a radar ray and the depth map; an intersection point sub-module 507, configured to update the length of the line segment corresponding to the radar ray by utilizing the depth value of the intersection point of the radar ray and the depth map so as to obtain a location of the intersection point of the radar ray on a surface of the object model.

In one implementation, the adding module 403 further includes: a maintaining sub-module 508, configured to maintain a radar ray unchanged in case that the radar ray does not intersect with the depth map of the object model.

Figure 6:
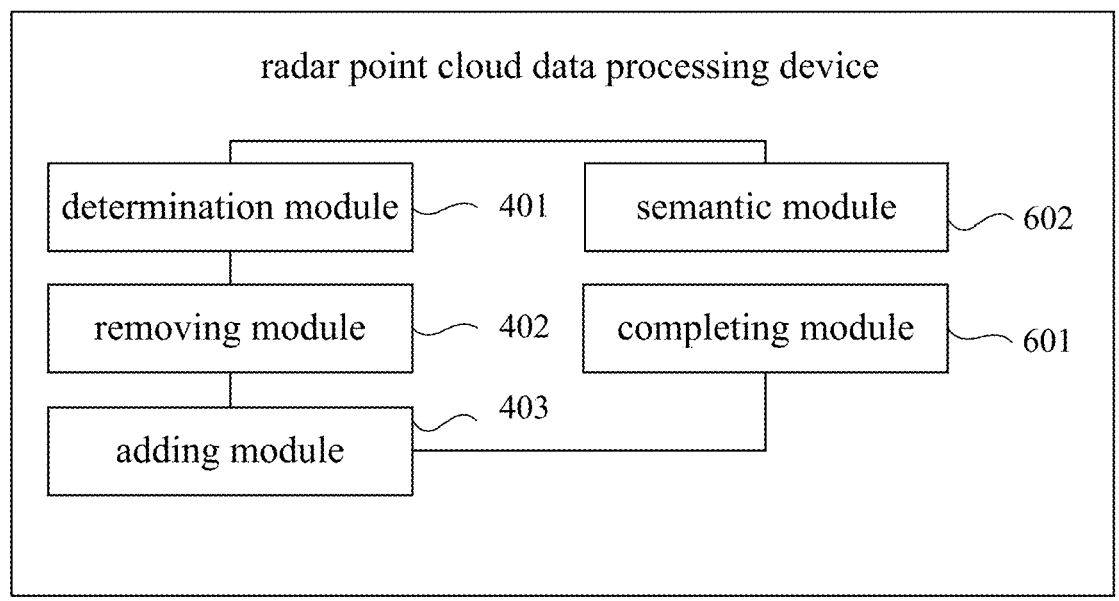
FIG. 6 is a block diagram of a radar point cloud data processing device according to another embodiment of the present disclosure.

FIG. 6 is a block diagram of a radar point cloud data processing data according to another embodiment of the present disclosure. The radar point cloud data processing data of this embodiment may include various components of the device embodiments described above. In this embodiment, in one implementation, the device further includes: a completing module 601, configured to perform completion processing on points belonging to the ground in the target location area by using a ground equation.

In one embodiment, the device further includes: a semantic module 602, configured to determine semantic information of each point in the target detection box, wherein the semantic information includes information on whether each point in the target detection box belongs to a target object.

One may refer to the corresponding description of above-described radar point cloud data processing methods for functions of each unit, module or sub-module in each radar point cloud data device of embodiments of the present disclosure, which will not be described in detail herein.

According to embodiments of the present disclosure, the present disclosure also provides an electronic apparatus, a readable storage medium, and a computer program product.

In one application example, based on the present disclosure may, in combination with image rendering technologies, it is possible to edit labeled three-dimensional radar point cloud, and replace an originally labeled object with a new object, which may, on one hand, add an object with a low probability of occurrence, and on the other hand, enhance an object that has yet to occur, and at the same time, add some scenes that are infrequent in automatic driving.

Figure 7:
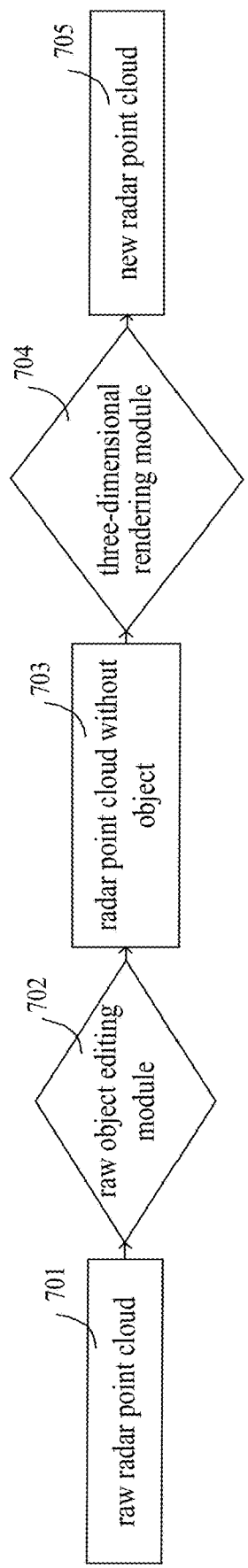
FIG. 7 is a schematic diagram of an application example of the present disclosure.

Based on the present disclosure, in combination with rendering technologies, it is possible to directly edit raw a radar point cloud, to obtain labeled abnormal data. The detailed flow process of a scheme of the present disclosure may be described below in connection with modules in reference to FIG. 7.

A raw object editing module 702:

a raw radar point cloud 701 may be provided with a target detection box of a labeled three-dimensional object. The target detection box may be determined through manual labeling or automatic labeling, and the location of the target detection box may be represented by three-dimensional coordinate information. Through the target detection box, the range of a target object may be determined, and the semantic information of each point in the range is calculated, such that the raw target object is edited. For example, if the target object is a vehicle, the semantic information of each point within the range of the target object determined by the target detection box may indicate that the point belongs to the vehicle. The semantic information of a point outside the range of the target object may indicate that the point does not belong to the vehicle. In the raw object editing module, each point of the target object may be traversed, forming a plurality of line segments by connecting those points and the center of a radar. The length of each line segment is updated to a maximum. For example, the maximum may be 300 m in automatic driving. The object is thus removed from the image, which is referred to as an object-free radar point cloud 703. In this example, the object-free radar point cloud 703 is primarily a radar point cloud from which the target object has been removed, i.e., a radar point cloud that does not include the target object.

A three-dimensional rendering module 704:

in the three-dimensional rendering module, in the object-free radar point cloud 703, a three-dimensional model, such as a CAD-format three-dimensional model, is placed at the location of the previously removed target object. For example, placing the three-dimensional model at the location where the target object has been removed is realized by, for example, adding the coordinates of each point of the three-dimensional model with some predetermined offset.

A depth map corresponding to the three-dimensional model is obtained through projection matrix rendering. For example, the vertices of the offset three-dimensional model are multiplied by a projection matrix, to obtain a depth map corresponding to the three-dimensional model. All radar rays are traversed.

The depth map may also be projected onto a same camera plane by the same projection matrix. For example, the depth map is multiplied by the projection matrix and the depth map can be projected onto the camera plane.

An inquiry is made in the depth map, and if a radar ray does not intersect with an object in the depth map, the radar ray is maintained unchanged; and if an intersection exists, an intersection point of the ray and the depth map is calculated, to obtain a depth value of the intersection point for updating. For example, the length of the line segment corresponding to the radar ray is updated. In this way, the intersection point of the radar ray with the depth map can be transferred to the surface of the three-dimensional model. For example, information such as the coordinate location of the intersection point of the radar ray at the surface of the three-dimensional model is obtained. The speed of depth value query can be accelerated by the three-dimensional rendering module.

Figure 8:
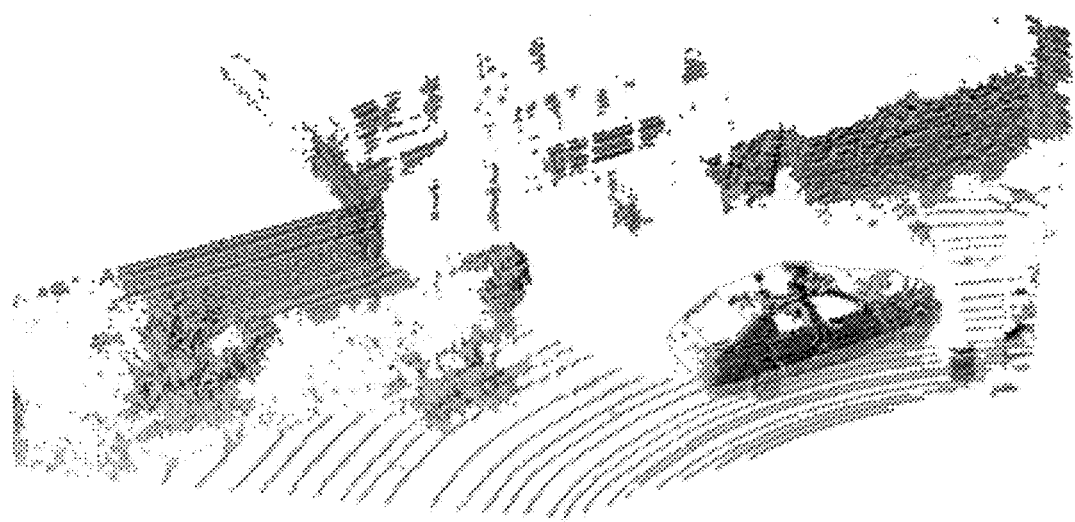
FIG. 8 is an effect diagram of a raw radar point cloud in an application example of the present disclosure.
Figure 9:
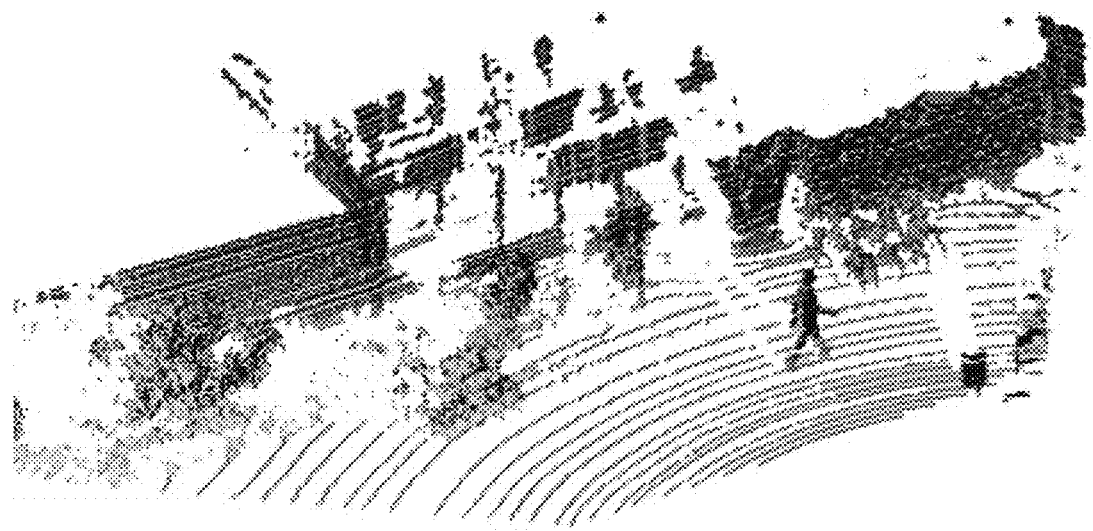
FIG. 9 is an effect diagram of a new radar point cloud in an application example of the present disclosure.

Finally, a new radar point cloud 705 can be obtained by the three-dimensional rendering module. An exemplary effect can be seen in the renderings, FIGS. 8 and 9. In these drawings, FIG. 8 is an example of a raw radar point cloud, assuming that the target object is a vehicle, and FIG. 9 is an edited new radar point cloud. As can be seen in FIGS. 8 and 9, by editing the radar point cloud, a target object that is originally a vehicle can be changed into a three-dimensional model of a certain pedestrian, and the shielding relationship of the radar point cloud can still stand.

By using the solutions of the present disclosure, an original labeled object (i.e. the target object) can be replaced with some uncommon objects (various three-dimensional models), thereby obtaining a large amount of labeled data of an abnormal type. By performing automatic driving simulation utilizing the large amount of labeled data of an abnormal type, automatic driving safety can be improved. By performing neural network training utilizing the large amount of labeled data of an abnormal type, a more accurate neural network model can be obtained.

Figure 10:
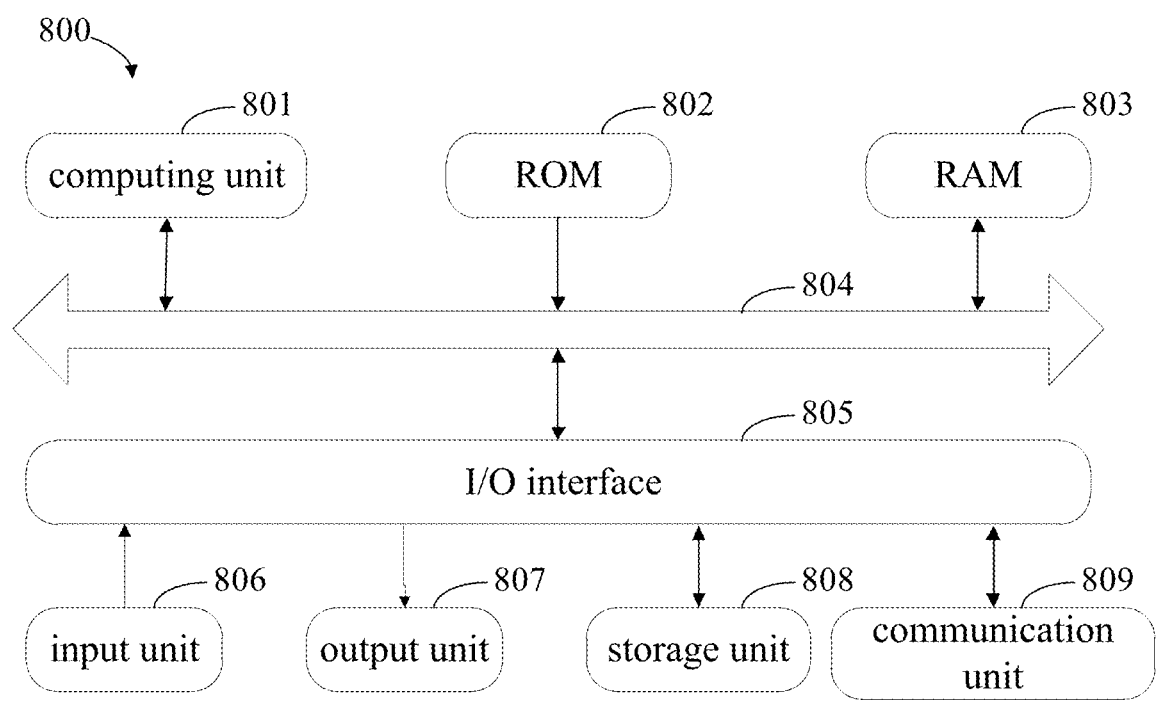
FIG. 10 shows a schematic block diagram of an exemplary electronic apparatus configured to implement embodiments of the present disclosure.

FIG. 10 shows a schematic block diagram of an exemplary electronic apparatus 800 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital assistants, cellular telephones, smart phones, wearable devices, and other similar computing devices. The components shown herein, their connections and relationships, and their functions are examples only and are not intended to limit the implementation of the present disclosure described and/or claimed herein.

As shown in FIG. 10, the device 800 includes a computing unit 801 that may perform various suitable actions and process in accordance with a computer program stored in a read only memory (ROM) 802 or a computer program loaded from a storage unit 808 into a random-access memory (RAM) 803. In the RAM 803, various programs and data required for the operation of the device 800 can also be stored. The computing unit 801, the ROM 802, and the RAM 803 are connected to each other through a bus 804. An input/output (I/O) interface 805 is also connected to the bus 804.

A number of components in the device 800 are connected to the I/O interface 805, including: an input unit 806, such as a keyboard and a mouse; an output unit 807, such as various types of displays and speakers; a storage unit 808, such as a magnetic disk and an optical disk; and a communication unit 809, such as a network card, a modem, and a wireless communication transceiver. The communication unit 809 allows the device 800 to exchange information/data with other devices over a computer network, such as the Internet, and/or various telecommunications networks.

The computing unit 801 may be various general purpose and/or special purpose processing components having processing and computing capabilities. Some examples of the computing unit 801 include, but are not limited to, a central processing unit (CPU), a graphics processing unit (GPU), various application specific artificial intelligence (AI) computing chips, various computing units running machine learning model algorithms, a digital signal processor (DSP), and any suitable processor, controller, microcontroller, etc. The computing unit 801 executes various methods and processing described above, such as the methods for processing radar point cloud data. For example, in some embodiments, the method for processing radar point cloud data processing may be implemented as a computer software program tangibly contained in a machine-readable medium, such as a storage unit 808. In some embodiments, some or all of a computer program may be loaded into and/or installed on the device 800 via the ROM 802 and/or the communication unit 809. When the computer program is loaded into the RAM 803 and executed by the computing unit 801, one or more steps of the methods for processing radar point cloud data described above can be performed. Alternatively, in other embodiments, the computing unit 801 may be configured to perform the methods for processing radar point cloud data by any other suitable means (for example, by means of firmware).

Various implementations of the systems and techniques described herein above may be realized in a digital electronic circuit system, an integrated circuit system, a field programmable gate array (FPGA), an application specific integrated circuit (ASIC), an application specific standard product (ASSP), a system on a chip (SOC), a load programmable logic device (CPLD), computer hardware, firmware, software, and/or combinations thereof. These various implementations may include: implementation in one or more computer programs, which can be executed and/or interpreted on a programmable system including at least one programmable processor, which can be an application specific or general-purpose programmable processor, can receive data and instructions from, and transmit data and instructions to, a storage system, at least one input apparatus, and at least one output apparatus.

Program codes for implementing the methods of the present disclosure may be written in any combination of one or more programming languages. These program codes may be provided to a processor or controller of a general purpose computer, dedicated computer, or other programmable data processing apparatus such that the program codes, when executed by the processor or controller, cause the functions/ operations specified in the flowcharts and/or block diagrams to be performed. The program codes may be executed entirely on a machine, partly on a machine, partly on a machine and partly on a remote machine as a stand-alone software package, or entirely on a remote machine or server.

In the context of the present disclosure, a machine-readable medium may be a tangible medium that can contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of a machine-readable storage medium may include an electrical connection based on one or more wires, a portable computer disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

In order to provide interactions with a user, the systems and techniques described herein may be implemented on a computer that has: a display device (for example, CRT (Cathode Ray Tube) or LCD (liquid crystal display) monitor) for displaying information to the user; and a keyboard and pointing device (for example, a mouse or a trackball) through which the user may provide input to the computer. Other kinds of devices may also be used to provide interactions with a user; for example, the feedback provided to a user may be any form of sensory feedback (for example, visual feedback, auditory feedback, or tactile feedback); and input from a user may be received in any form (including acoustic input, voice input, or tactile input).

The systems and techniques described herein may be implemented in a computing system (for example, as a data server) that includes back-end components, or a computing system (for example, an application center) that includes middleware components, or a computing system (for example, a user computer with a graphical user interface or a web browser through which the user may interact with the implementation of the systems and techniques described herein) that includes front-end components, or a computing system that includes any combination of such back-end components, middleware components, or front-end components. The components of the system may be interconnected by any form or medium of digital data communication (for example, a communication network). Examples of communication networks include: Local Area Networks (LANs), Wide Area Networks (WANs), and the Internet.

The computer system may include a client and a server. The client and the server are generally remote from each other and typically interact through a communication network. The client-server relationship is generated by computer programs running on respective computers and having a client-server relationship with each other.

It should be understood that various forms of processes shown above may be used to reorder, add, or delete steps. For example, respective steps described in the present disclosure may be executed in parallel, or may be executed sequentially, or may be executed in a different order, so long as the desired result of the technical solutions disclosed in the present disclosure can be achieved, and no limitation is made herein.

The above-described specific embodiments do not constitute a limitation on the scope of protection of the present disclosure. It should be understood by those skilled in the art that various modifications, combinations, sub-combinations, and substitutions may be made, according to design requirements and other factors. Any modification, equivalent replacement, improvement, and the like within the spirit and principle of the present disclosure shall fall within the scope of protection of the present disclosure.

What is claimed is:

1. A radar point cloud data processing method, comprising:
   determining a target location area where a target object is located by utilizing a target detection box in the radar point cloud data;
   removing each point of the target object in the target location area from the radar point cloud data; and
   adding an object model to the target location area, to obtain updated radar point cloud data,
   wherein the removing each point of the target object in the target location area from the radar point cloud data comprises:
   generating a line segment from the center of a radar to each point of the target object by utilizing coordinates of the center of the radar and coordinates of each point of the target object; and
   removing each point of the target object in the target location area from the radar point cloud data by updating the length of each line segment to a preset maximum.

2. The radar point cloud data processing method according to claim 1, wherein the target detection box is a three-dimensional box; the target object is a three-dimensional object, and the object model is a three-dimensional model.

3. The radar point cloud data processing method according to claim 1, wherein the adding an object model to the target location area comprises:
adding a location of each point of the object model with a preset offset to determine the location of the object model in the target location area.

4. The radar point cloud data processing method according to claim 3, characterized in that the adding an object model to the target location area further comprises:
rendering the object model through a projection matrix, to obtain a depth map corresponding to the object model;
projecting the depth map to a camera plane through the projection matrix;
inquiring in the depth map to obtain a depth value of an intersection point of a radar ray and the depth map; and
updating the length of the line segment corresponding to the radar ray by utilizing the depth value of the intersection point of the radar ray and the depth map to obtain the location of the intersection point of the radar ray on a surface of the object model.

5. The radar point cloud data processing method according to claim 4, wherein the adding an object model to the target location area further comprises: maintaining the radar ray unchanged in case that the radar ray does not intersect with the depth map of the object model.

6. The radar point cloud data processing method according to claim 1, further comprising: performing completion processing on points belonging to the ground in the target location area by utilizing a ground equation.

7. The radar point cloud data processing method according to claim 1, further comprising: determining semantic information of each point in the target detection box, wherein the semantic information comprises information on whether each point in the target detection box belongs to the target object.

8. A computer program product comprising computer executable instructions stored thereon, wherein the executable instructions, when executed by a processor, cause the processor to implement the method according to claim 1.

9. A radar point cloud data processing device, comprising:
at least one processor; and
a memory communicatively connected to the at least one processor, wherein
the memory stores instructions executable by the at least one processor, the instructions are executed by the at least one processor to enable the at least one processor to:
determine a target location area where a target object is located by utilizing a target detection box in the radar point cloud data;
remove each point of the target object in the target location area from the radar point cloud data; and
add an object model to the target location area, to obtain updated radar point cloud data,
wherein the instructions are executed by the at least one processor to further enable the at least one processor to:
generate a line segment from the center of a radar to each point of the target object by utilizing coordinates of the center of the radar and coordinates of each point of the target object; and
remove each point of the target object in the target location area from the radar point cloud data by updating the length of each line segment to a preset maximum.

10. The radar point cloud data processing device according to claim 9, wherein the target detection box is a three-dimensional box; the target object is a three-dimensional object, and the object model is a three-dimensional model.

11. The radar point cloud data processing device according to claim 9, wherein the instructions are executed by the at least one processor to further enable the at least one processor to:
add a location of each point of the object model with a preset offset to place the object model at a location in the target location area.

12. The radar point cloud data processing device according to claim 11,
wherein the instructions are executed by the at least one processor to further enable the at least one processor to:
render the object model through a projection matrix, to obtain a depth map corresponding to the object model;
project the depth map to a camera plane through the projection matrix;
inquire in the depth map, to obtain a depth value of an intersection point of a radar ray and the depth map; and
update the length of the line segment corresponding to the radar ray by utilizing the depth value of the intersection point of the radar ray and the depth map to obtain the location of the intersection point of the radar ray on a surface of the object model.

13. The radar point cloud data processing device according to claim 12, wherein the instructions are executed by the at least one processor to further enable the at least one processor to maintain the radar ray unchanged in case that the radar ray does not intersect with the depth map of the object model.

14. The radar point cloud data processing device according to claim 9, wherein the instructions are executed by the at least one processor to further enable the at least one processor to perform completion processing on points belonging to the ground in the target location area by utilizing a ground equation.

15. The radar point cloud data processing device according to claim 9, wherein the instructions are executed by the at least one processor to further enable the at least one processor to determine semantic information of each point in the target detection box, wherein the semantic information comprises information on whether each point in the target detection box belongs to the target object.

16. A non-transitory computer-readable storage medium for storing computer instructions, wherein the computer instructions, when executed by a computer, cause the computer to:
determine a target location area where a target object is located by utilizing a target detection box in the radar point cloud data;
remove each point of the target object in the target location area from the radar point cloud data; and
add an object model to the target location area, to obtain updated radar point cloud data,
wherein the computer instructions, when executed by a computer, further cause the computer to:
generate a line segment from the center of a radar to each point of the target object by utilizing coordinates of the center of the radar and coordinates of each point of the target object; and
remove each point of the target object in the target location area from the radar point cloud data by updating the length of each line segment to a preset maximum.

17. The non-transitory computer-readable storage medium according to claim 16, wherein the target detection box is a three-dimensional box; the target object is a three-dimensional object, and the object model is a three-dimensional model.

\* \* \* \* \*